United States Patent

Nakayama

[11] Patent Number: 6,049,087
[45] Date of Patent: *Apr. 11, 2000

[54] METHOD FOR DETECTING ORIGIN POINT OF POSITION SENSOR

[75] Inventor: Akihito Nakayama, Tokyo, Japan

[73] Assignee: Sony Corporation, Tokyo, Japan

[*] Notice: This patent is subject to a terminal disclaimer.

[21] Appl. No.: 09/184,129

[22] Filed: Nov. 2, 1998

Related U.S. Application Data

[60] Continuation of application No. 08/588,045, Jan. 22, 1996, Pat. No. 5,955,728, which is a division of application No. 08/117,713, Sep. 8, 1993, Pat. No. 5,534,692.

[30] Foreign Application Priority Data

Sep. 14, 1992 [JP] Japan ................................ 4-270880
Sep. 18, 1992 [JP] Japan ................................ 4-275239

[51] Int. Cl.[7] ................................ G01N 21/86; G01D 5/34; G01B 11/14
[52] U.S. Cl. ................................ 250/559.3; 250/231.16; 356/375
[58] Field of Search ................................ 250/231.16, 559.3, 250/55.47, 231.17; 356/375

[56] References Cited

U.S. PATENT DOCUMENTS

| | | | |
|---|---|---|---|
| 4,788,422 | 11/1988 | Fujiwara | 356/375 |
| 4,948,968 | 8/1990 | Matsui | 250/231.18 |
| 4,977,554 | 12/1990 | Hangai et al. | 369/215 |
| 5,534,692 | 7/1996 | Nakayama | 250/231.16 |

*Primary Examiner*—William L. Sikes
*Assistant Examiner*—Dung Nguyen
*Attorney, Agent, or Firm*—Rader, Fishman & Grauer; Ronald P. Kananen

[57] ABSTRACT

A method for detecting the point of origin of a position sensor such as an optical linear scale by first displacing an object member whose position is to be determined until it butts against a mechanical stopper, then determining the position of the object member at the mechanical stopper and using that position as a reference position for the point of origin, and thereafter detecting the position of the object member by means of the position sensor, thereby detecting the position of the object member relative to the point of origin. In another embodiment, a first point of origin signal is obtained from an optical linear scale used as a position sensor and stored in response to latching signal generated at an end point of travel of the object member. Subsequently, when a second point of origin signal from the optical linear scale is compared with the first point of origin signal, any deviation from the first point of origin signal may be corrected based on the result of the comparison.

13 Claims, 15 Drawing Sheets

FIG. 6

| PHASE | RELATION AMONG WAVEFORM VALUES | | |
|---|---|---|---|
| 1 | $A\cos\theta \geq$ | $A\sin\theta >$ | $-A\sin\theta$ |
| 2 | $A\sin\theta >$ | $A\cos\theta \geq$ | $-A\cos\theta$ |
| 3 | $A\sin\theta \geq$ | $-A\cos\theta >$ | $A\cos\theta$ |
| 4 | $-A\cos\theta >$ | $A\sin\theta \geq$ | $-A\sin\theta$ |
| 5 | $-A\cos\theta \geq$ | $-A\sin\theta >$ | $A\sin\theta$ |
| 6 | $-A\sin\theta >$ | $A\cos\theta \geq$ | $A\cos\theta$ |
| 7 | $-A\sin\theta \geq$ | $A\cos\theta >$ | $-A\cos\theta$ |
| 8 | $A\cos\theta >$ | $-A\sin\theta \geq$ | $A\sin\theta$ |

|     | P0   | P1   | P2   | P3   |
|-----|------|------|------|------|
| φa  | HIGH | HIGH | LOW  | LOW  |
| φb  | HIGH | LOW  | LOW  | HIGH |

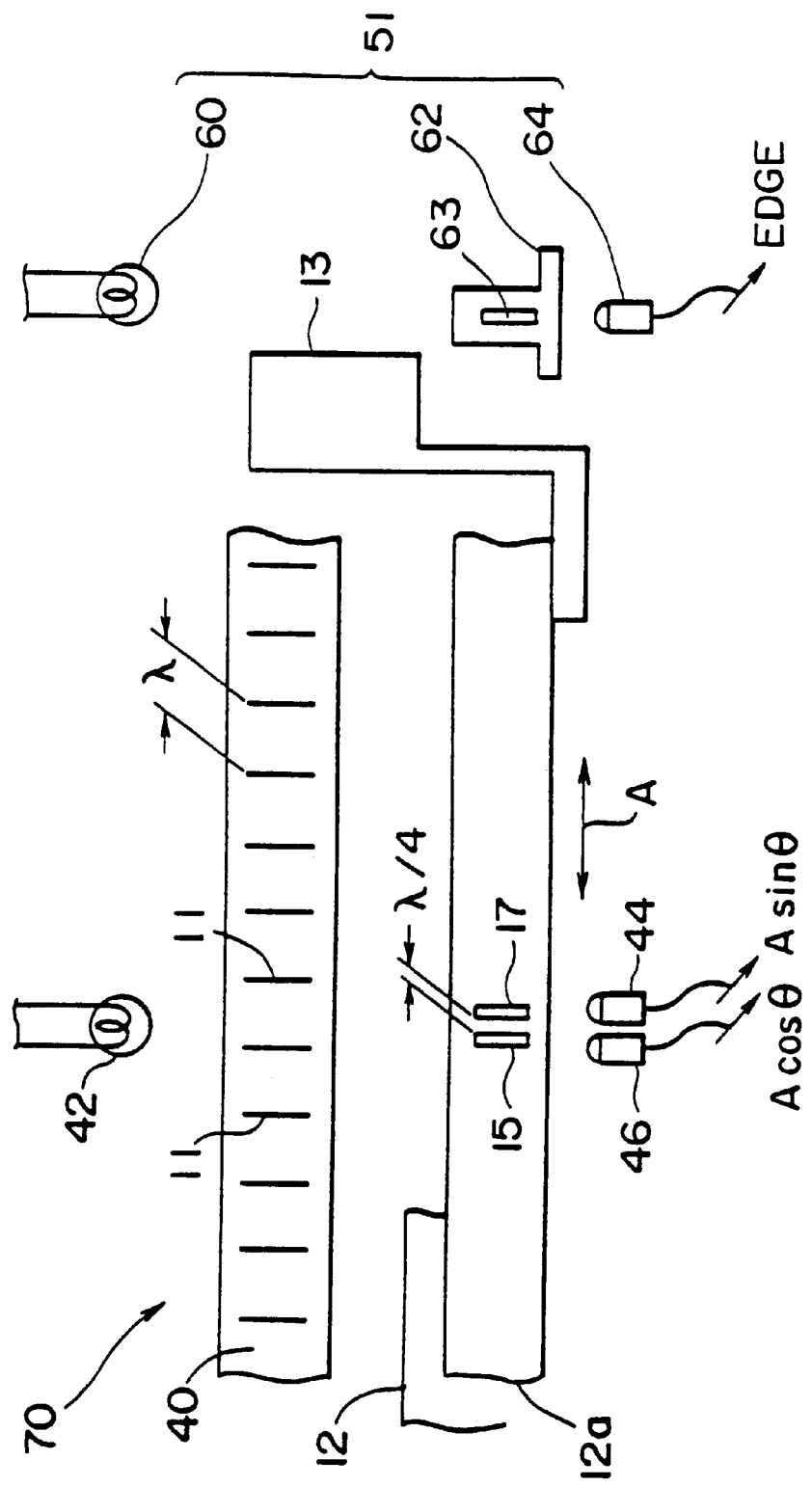

METHOD FOR DETECTING ORIGIN POINT OF POSITION SENSOR

This application is a continuation of application Ser. No. 08/588,045 filed Jan. 22, 1996, now U.S Pat. No. 5,955,728; which is a divisional of application Ser. No. 08/117,713 filed Sep. 8, 1993, now U.S Pat. No. 5,534,692 entitled METHOD FOR DETECTING ORIGIN POINT OF POSITION SENSOR.

BACKGROUND OF THE INVENTION

1. Field of the Invention

The present invention relates to a method for detecting the point of origin of a position sensor used, for example, for focusing a lens of an optical system, for positioning a work table of a machine tool, or the like.

2. Description of the Related Art

It is generally known that when a table of a machine tool or the like having a workpiece positioned thereon is displaced by a certain distance in an X-axis or Y-axis direction, the distance of such displacement is commonly measured by the use of a position sensor, such as a linear scale, so that the position of the workpiece on the table may be determined. Such position sensors may comprise a movable unit anchored to the table (the table in this example being the object member to be measured) and a stationary unit anchored to a base of the position sensor. As the table is displaced, the movable unit is also displaced with respect to the stationary unit. The length of the displacement of the table is calculated on the basis of the relative movement between the moveable and stationary units.

In accomplishing the above measurement, the reference position for the position sensor used for setting the measuring position to an absolute value, i.e., for detecting the point of origin, is conventionally determined as follows. A light shield plate is fixedly attached to the movable unit, and an end point sensor, such as a photo interrupter, is positioned in proximity with the position sensor. As the shield plate is displaced with the movable unit towards the end point of displacement of the moveable unit, the shield plate ultimately intercepts light to the photo interrupter to consequently change the output of the end point sensor, which, for example, may thereby be switched from an off to an on condition. It has been customary heretofore that the change point of the output of the end point sensor is regarded as the reference point or point of origin of the position sensor.

Thus, in order to set the position of the position sensor to an absolute value using conventional methods, it was necessary to use an external end point sensor, such as a photo interrupter, in order to determine the reference position for the absolute value. Consequently, the position detecting system as a whole is rendered bulky. Such units also involve other problems, including a relatively high cost of production.

Furthermore, when using an end point sensor, some variations in the output of the end point sensor may be experienced due to temperature fluctuations, environmental changes and so forth. Such variations may result in variations of position determinations made based on the above mentioned reference point. Consequently, the precision of this positioning point suffers in terms of accuracy.

In systems where position detection is performed by quantizing the output of a position sensor, in principle, a quantization error of plus or minus one pulse may exist. In other words, the absolute position is only accurate to a variation equivalent to the quantization error. of course, the precision of an absolute value so determined may-be adversely affected by the quantization error.

SUMMARY OF THE INVENTION

It is therefore an object of the present invention to provide an improved method for detecting the origin point of a position sensor.

The method, according to one aspect of the present invention, may comprise the steps of first displacing an object member to butt against a stop means disposed proximate to the end of a displacement range of the object member, then detecting the point of origin of the displacement member on the basis of any change therein, e.g., a change in the output of a position sensor which detects the position of the object member, and resetting the position sensor at the detected point of origin.

Preferably, after the object member arrives at the stop means, the method further comprises the steps of pressing the object member against the stop means by using a constant force or thrust, and resetting the point of origin of the position sensor when the change, e.g., in the position of the position sensor at the time of the pressed contact between the object member and the stop means is smaller than a predetermined value.

Also preferably, the method further comprises the steps of pressing the object member against the stop means, and resetting the point of origin of the position sensor when there is no change in the point of origin position of the position sensor at the time of the pressed contact between the object member and the stop means.

Preferably, the position sensor performs its operation using a plurality of repetitive periodic waveforms.

Preferably, the repetitive periodic wave-forms may be composed of sine waves and cosine waves.

Preferably, the position sensor is a linear position sensor.

Preferably, the linear position sensor is used in connection with a drive mechanism having a direct drive motor.

Preferably, the linear position sensor may be used in connection with-an optical drive means for a video camera.

Another aspect of the present invention resides in providing an improved method for detecting the point of origin of a position sensor. The method comprises the steps of first displacing an object member to butt against a stop means disposed proximate to the end of a displacement range of the object member, then detecting the point of origin of the object member on the basis of a change of position of the position sensor which used to detect the position of the object member; storing a first phase of repetitive periodic waveforms obtained from the position sensor as the point of origin as reference data in a storage medium; comparing the first phase with a second phase of the repetitive periodic waveforms obtained from the position sensor at the time of detection of the point of origin subsequent to detection of the reference data; and detecting the position of the object member on the basis of the repetitive periodic waveforms for correction of the second phase.

A further aspect of the present invention is to provide an improved method for detecting the point of origin of a position sensor. The method comprises the steps of detecting the arrival of an object member at the end of a displacement range thereof by means of an end point sensor disposed proximate to the end of the displacement range; storing as reference data in a storage medium the output of the position sensor (which detects the position of the object member), then, in response to each output signal from the end point sensor obtained after detection of the reference data, comparing the output of the position sensor with the stored reference data and correcting the point of origin reference data for the position sensor in accordance with the result of the comparison.

The above and other features and advantages of the present invention will become apparent from the following description which will be given with reference to the accompanying illustrative drawings.

BRIEF DESCRIPTION OF THE DRAWINGS

FIG. 6 is a table showing the relationship of values among the signals of the periodic waveforms shown in FIG. 5, and also the relationship between the signals and the phases;

FIG. 13 illustrates the optical linear scale and end point sensor of the system of FIG. 12;

DESCRIPTION OF THE PREFERRED EMBODIMENTS

Hereinafter the preferred embodiments of the present invention will be described in detail with reference to the accompanying drawings. Although the embodiments described below represent examples of presently preferred embodiments of the invention, it should be understood that the scope of the invention is not intended to be limited to such exemplary embodiments unless a particular description includes such a specific limitation.

Figure 1:
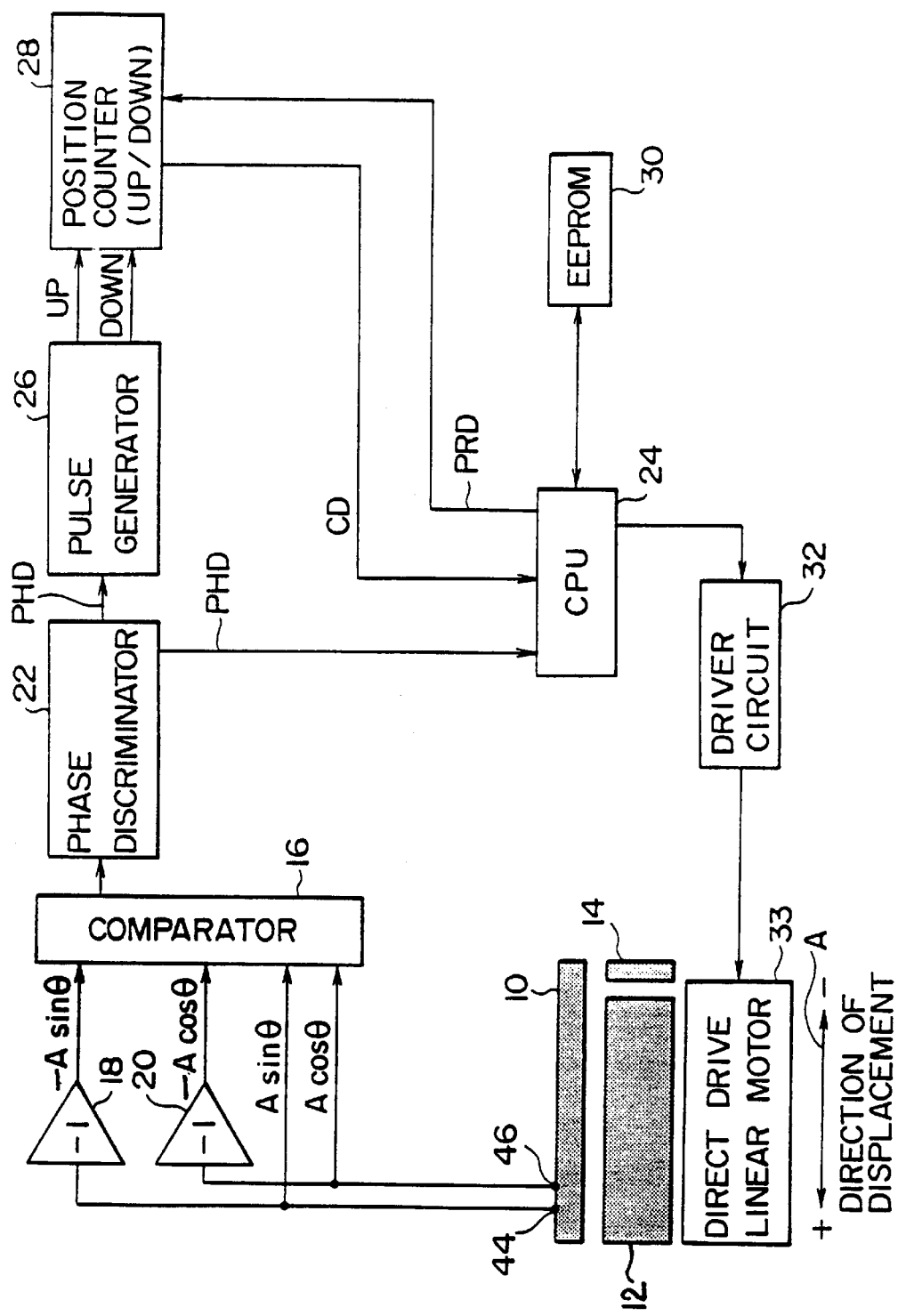
FIG. 1 is a block diagram of a preferred position detecting system for carrying out the method of the present invention for detecting the origin point of a position sensor.

FIG. 1 is a block diagram of a preferred embodiment of a position detecting system for carrying out the method of the present invention for detecting the point of origin a position sensor. The position detecting system of FIG. 1 comprises an optical linear scale 10, an object member 12 to be measured, a mechanical stopper 14, two inverting amplifiers 18 and 20, a comparator 16, a phase discriminator 22, a CPU 24, a pulse generator 26, a position counter 28, an EEPROM 30, a drive circuit 32, and a direct drive linear motor 33. The object member to be measured in this example is a table of a machine tool for holding a workpiece thereon or the like.

The optical linear scale 10, which serves as a position sensor in this embodiment, will now be described with reference the embodiment of to FIG. 2. In the illustrated embodiment, the optical linear scale 10 includes a slit plate 40, a light emitting element 42, two light receiving elements 44, 46, and a measuring plate 12a. The slit plate 40, the light emitting element 42 and the two light receiving elements 44, 46 collectively constitute a stationary unit. The measuring plate 12a constitutes a movable unit which moves in conjunction with the object member 12 shown in FIG. 1, in this example a worktable of a machine tool. The movable unit is displaceable in the directions indicated by arrow heads of the arrow A.

Figure 2:
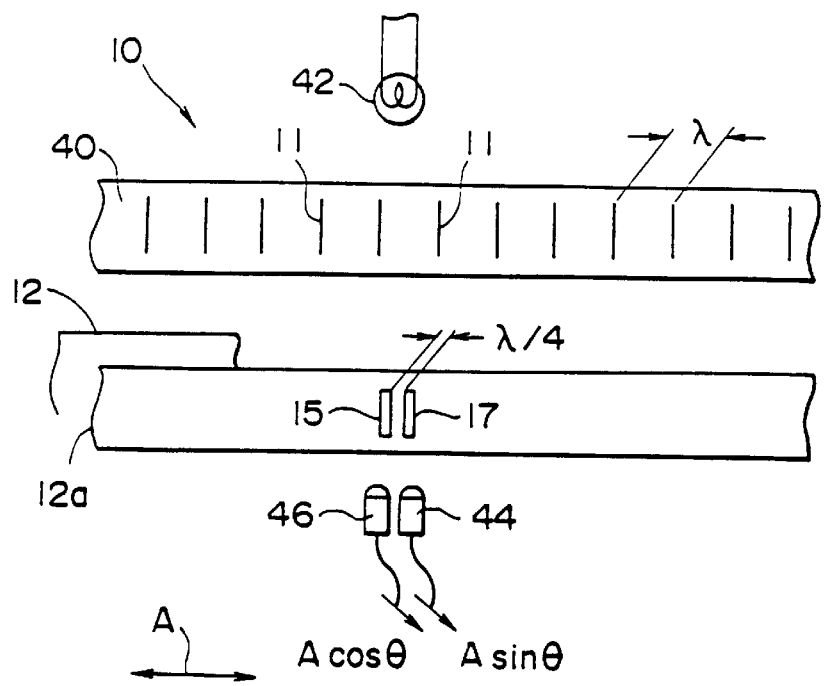
FIG. 2 illustrates an embodiment of the optical linear scale and object member of FIG. 1.
Figure 3:
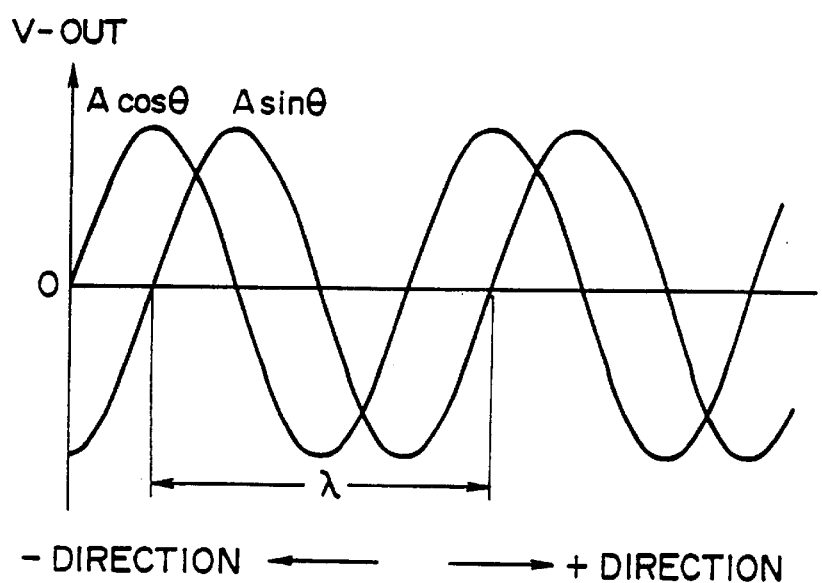
FIG. 3 is a graph depicting exemplary periodic waveforms outputted from light receiving elements in the optical linear scale.

As shown in FIG. 2, in the illustrated embodiment the slit plate 40 has a plurality of slits 11 regularly arrayed along its length at a predetermined pitch λ ($\mu$m). The measuring plate 12a is disposed in parallel with the slit plate 40 and has two slits 15, 17 which are spaced apart from each other by an interval of λ/4. The light emitting element 42 may, for example, be an LED, and the light receiving elements 44, 46 may, for example, be photoelectric conversion elements (solar batteries). The light output from the light emitting element 42 is transmitted, via one of the slits 11 and the slits 15 and 17, to the light receiving elements 44 and 46, respectively. The light receiving elements 44 and 46 respectively produce output signals, Asin θ and Acos θ, in the form of repetitive periodic waveforms as shown in FIG. 3.

Figure 4:
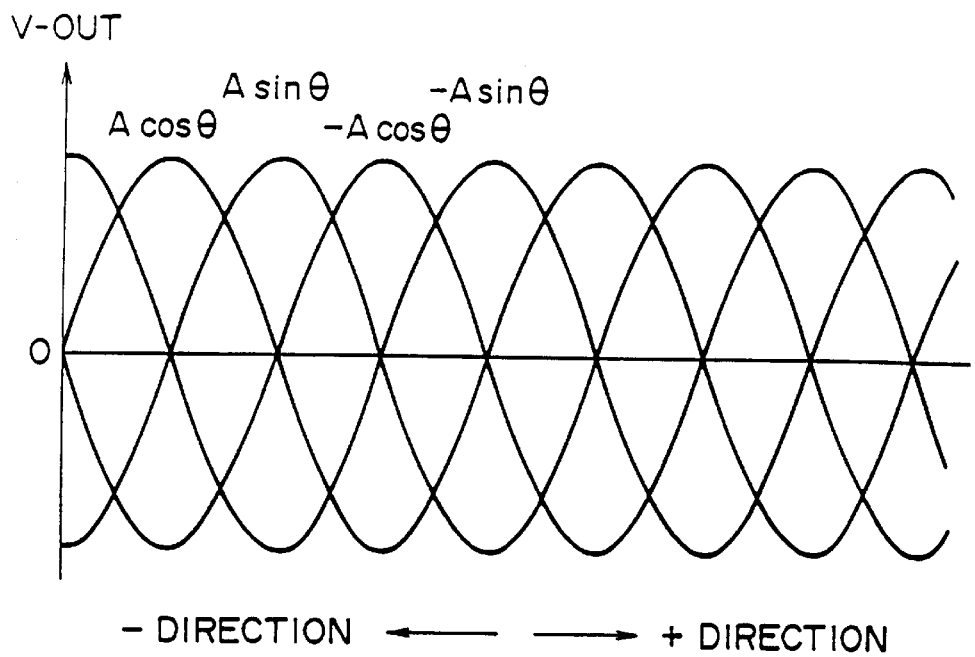
FIG. 4 is a graph depicting the periodic waveforms output from the light receiving elements in the optical linear scale, and also inverted waveforms thereof.

The light receiving elements 44 and 46 of FIG. 2 are connected directly to the input terminals of the comparator 16 shown in FIG. 1 and also, via the inverting amplifiers 18 and 20, to the input terminals of the comparator 16, the inverting amplifiers 18 and 20 (each of which has a gain of minus 1) to thereby invert the output signals Asin θ and Acos θ from the light receiving elements 44 and 46 into output signals −Asin θ and −Acos θ. The four above-mentioned signals (Asin θ, Acos θ, -Asinθ and −Acos θ) which are shown in FIG. 4, are input to the comparator 16.

The output terminal of the comparator 16 is connected to the phase discriminator 22, which is connected to both the CPU 24 and the pulse generator 26. The phase discriminator 22 receives the output of the comparator 16 and outputs a phase data signal PHD, (described below) to both the CPU 24 and the pulse generator 26.

Based on the phase data PHD, the pulse generator 26 supplies either an up-pulse or a down-pulse to the position counter 28. The position counter 28 is bidirectionally connected to transfer data to and from the CPU 24. More specifically, the position counter 28 supplies position count data CD to the CPU 24, while the CPU 24 supplies preset data PRD to the position counter 28.

The mechanical stopper 14 shown in FIG. 1 is preferably anchored beside the object member 12 to be measured and positioned to forcibly stop the object member 12 from being displaced by the direct drive linear motor 33 beyond a certain position in the minus (−) direction as indicated by the arrow A.

Figure 5:
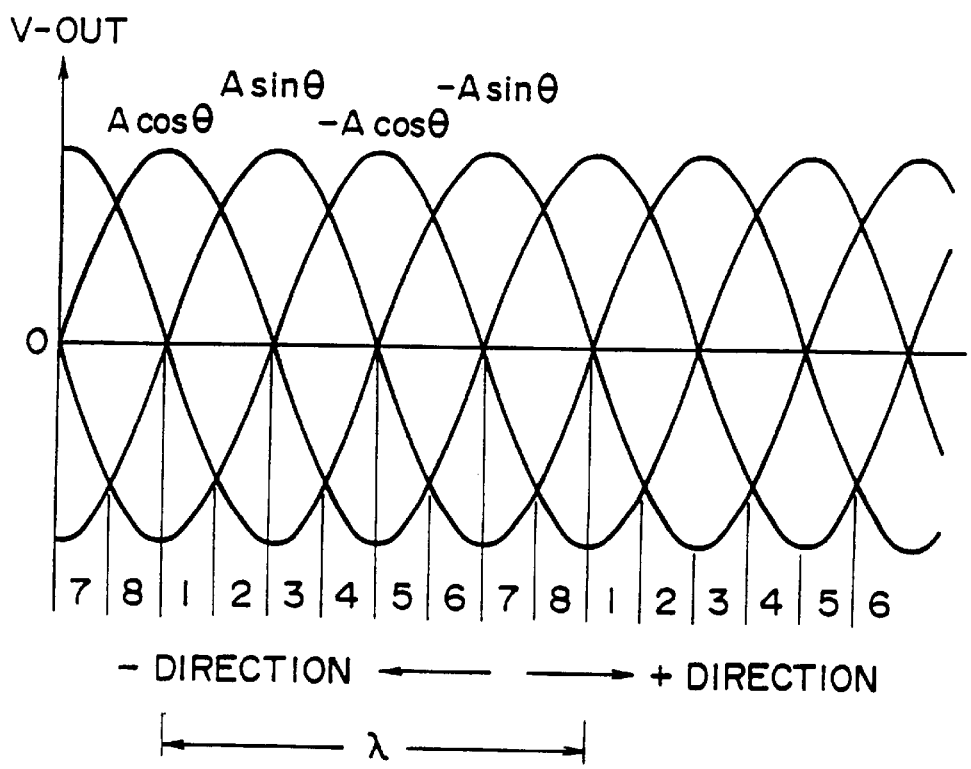
FIG. 5 is a graph depicting eight divided phases of the periodic waveforms of FIG. 4 output from the light receiving elements in the optical linear scale.

As will be appreciated by the artisan viewing the relationship among the values of the four signals Asin θ, Acos θ, −Asin θ and −Acos θ shown in FIG. 4, one period, λ, can be divided into eight phases as shown in FIG. 5. In FIG. 5, each of the eight phases is denoted by the numerals 1 through 8; the relationship among the values of the input signals to the comparator 16 being represented by the phase reference numbers charted in the table of FIG. 6.

The phase discriminator 22, shown in FIG. 1, decodes the relationship among the values output by the comparator 16, based on the four input signals thereto, into the phase signals 1 through 8 as charted in FIG. 6, and outputs the signal PHD, indicative of the appropriate phase relationship, 1 through 8.

The pulse generator 26 of FIG. 1 determines the direction of movement of the object member on the basis of the phase turnover edge and the phase relationship before and after such turnover, and generates either an up-pulse or a down-pulse corresponding to a determination of plus direction displacement or minus direction displacement.

The position counter 28 shown in FIG. 1 serves as an up/down counter which increases its count value by 1 in response to an up-pulse from the pulse generator 26 or decreases its count value by 1 in response to a down-pulse, thereby generating a count data signal CD indicative of the position of the object member. The position count data CD is supplied to the CPU 24.

The position counter 28 is so formed as to be capable of receiving preset data in response to the preset data PRD transferred from the CPU 24. An EEPROM 30, which serves as an external storage medium, is connected to the CPU 24 so that any data in the CPU 24 can be stored therein even when the power supply is off.

The CPU 24 is connected to the drive circuit 32, and the direct drive linear motor 33 is actuated via the drive circuit 32 to thereby displace the object member 12 in the appropriate direction, as indicated by arrow heads of the arrow A. In this manner, the CPU 24 controls the driving of the object member 12 and thereby its position.

Now the position detecting method of the above system will be described by reference to some examples of its operation.

Figure 7:
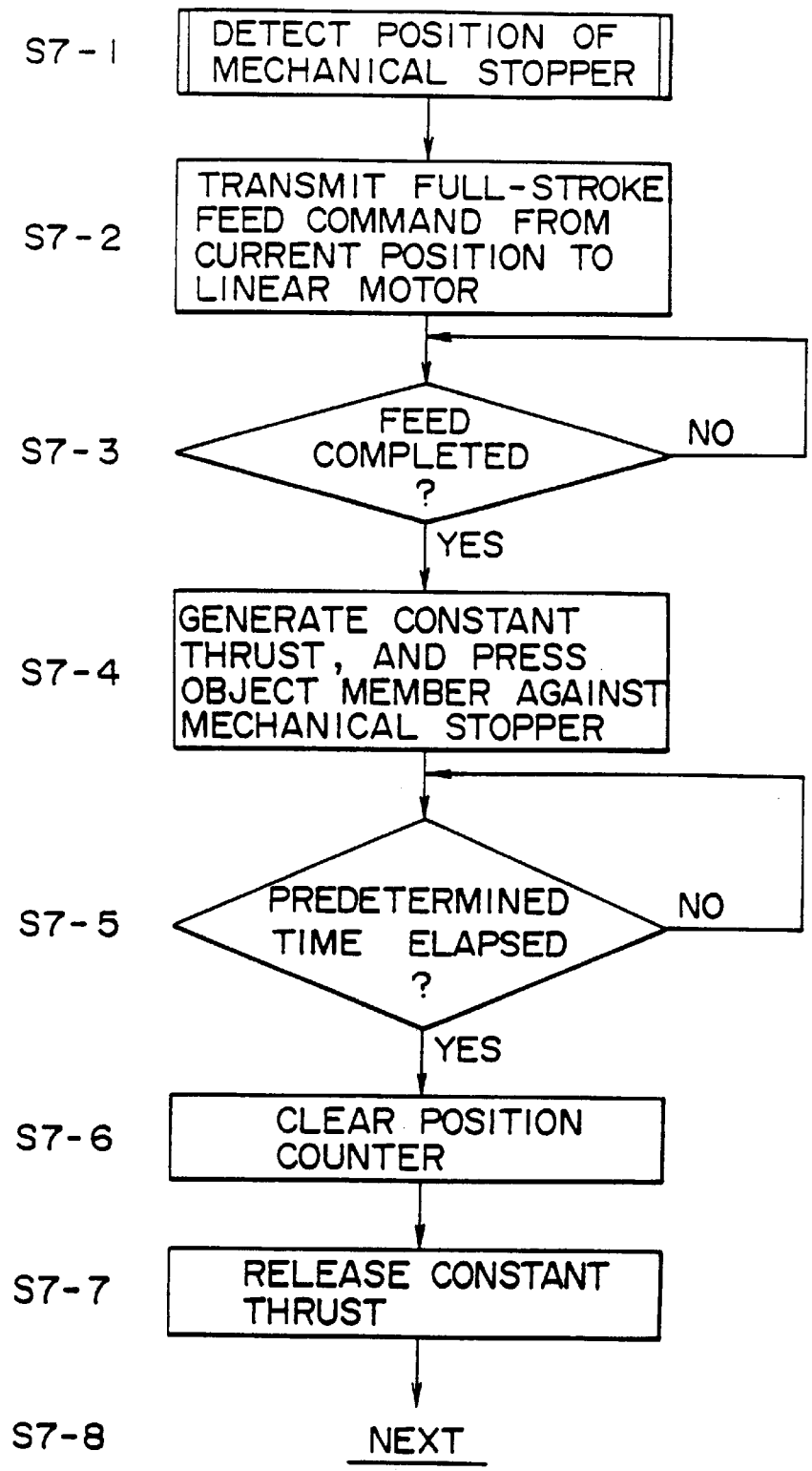
FIG. 7 is a flow chart depicting an exemplary sequence of steps for detecting the position of an end point with pressed contact caused by the application of a constant force.

First an explanation will be given with reference to FIGS. 1 and 7. FIG. 7 is a flow-chart of an exemplary sequence of steps for detecting the end point of movement of the object member by the application of a constant thrust on the object member 12 after it reaches the stopper 14. In this sequence, the object member 12, whose position is to be measured, is pressed firmly against the mechanical stopper 14 by a constant thrust generated by the direct drive linear motor 33 shown in FIG. 1. Then, the position of the object member 12 is determined as a reference position for detecting the point of origin.

Prior to setting the position of the object member 12 to an absolute value, its position, which corresponds to the position of the movable unit 12a of the position sensor, is indefinite. In order to determine an absolute position, the object member 12 is firmly pressed against the mechanical stopper 14, as shown at steps S7-1 and S7-2 of the sequence of FIG. 7.

First, the CPU 24 transmits a command to the drive circuit 32 to displace the object member 12 toward the mechanical stopper 14 by a distance equivalent to the full stroke in the minus (−) direction as indicated by the arrow A in FIG. 1. Ultimately, the object member 12 will mechanically butt against the stopper 14 and thereby be brought to a stop at the position of the stopper 14. Upon completion of such displacement (step S7-3), at step S7-4 the drive circuit 32 causes the direct drive linear motor 33 to generate a constant force or thrust in the direction to press the object member 12 against the mechanical stopper 14. As a result, the object member 12 is mechanically pressed against the stopper 14 by the thrust of the direct drive linear motor 33. At step S7-5, the constant thrust is applied for a fixed period of time.

At step S7-6, after the fixed period of time has lapsed, the CPU 24 supplies preset data PRD to the position counter 28 of FIG. 1 to thereby clear the position counter 28 in order to set the position of the object member 12 to an absolute value, as described below. At step S7-7, after the position counter 28 has been cleared, the constant thrust exerted by the direct drive linear motor 33 toward the mechanical stopper 14 is released, and the process proceeds to its normal operation mode.

Once the position counter 28 is cleared, the position of the mechanical stopper 14 becomes the origin 0 or absolute position. After completion of the sequence of FIG. 7, the data (PRD) in the position counter 28 signifies the absolute position of the object number 12 with respect to the point of origin, i.e., the stopper 14. Reliable and reproducible position detection is enhanced in this system by mechanically pressing the object member 12 against the stopper 14 using a constant thrust under the same conditions each time the point of origin is to be determined. Furthermore, since the direct drive linear motor 33 forcibly presses the object member 12 toward the mechanical stopper 14 by generating a constant thrust, no positional variation in the point of origin determination will occur despite occasional, small disturbance, i.e., disturbances smaller than the constant thrust generated at the time of detecting the position of the object member at the mechanical stopper 14. Therefore this system has the additional benefit of improving the capability of protecting the accuracy of the absolute position determination from errors which may result from such disturbances.

Figure 8:
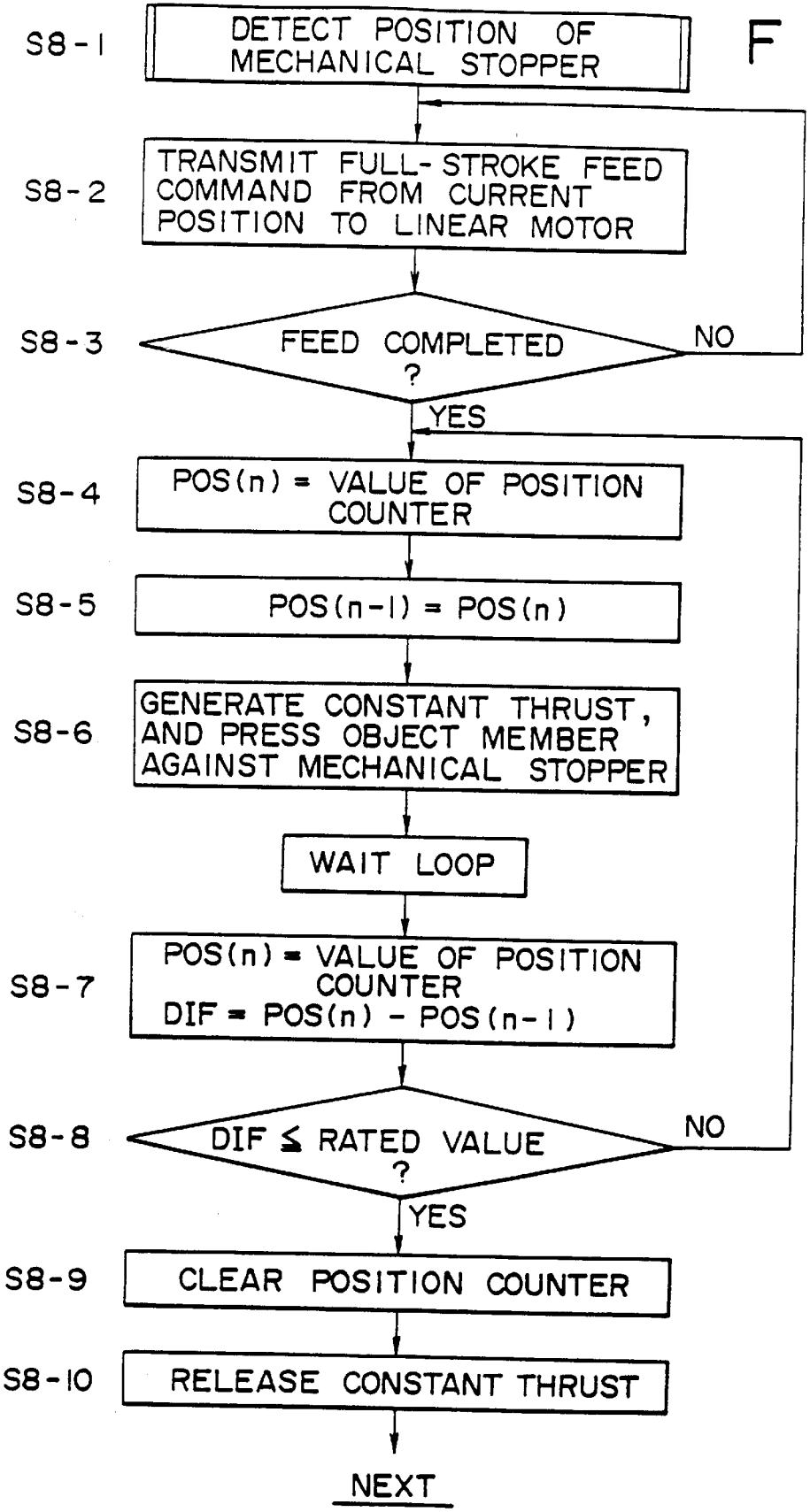
FIG. 8 is a flow chart depicting an exemplary sequence of steps for detecting the position of an end point by confirming a halt of the object member at a mechanical stopper.

The next process will be described with reference to FIGS. 1 and 8. FIG. 8 is a flow chart of an exemplary sequence of steps for detecting the position of the end point of displacement of an object member by confirming that the object member 12 has stopped at the mechanical stopper 14. In this sequence, confirmation is obtained that the object member 12 is at a complete stop and at the mechanical stopper 14, or that any change in position of the object member is smaller than a predetermined value. Such a position is regarded as a halt position of the object member 12 at the mechanical stopper 14, i.e., the point of origin.

First, as shown at steps S8-1 and S8-2 in FIG. 8, the CPU 24 of FIG. 1 transmits a command to the drive circuit 32 to displace the object member 12 toward the mechanical stopper 14 by a distance equivalent to the full stroke in the minus (−) direction as indicated by the arrow A, so that the direct drive linear motor 33 will displace the object member 12 until it positively butts against the mechanical stopper 14.

Subsequently, as shown at steps S8-3 and S8-4, upon termination of the displacement of the object member 12, the CPU 24 determines the value of the position counter 28 as POS(n). The succeeding steps S8-5 through S8-7 form a loop. The direct drive linear motor 33 presses the object member 12 against the mechanical stopper 14 while generating a constant thrust and maintains such action until the position of the object member 12 remains unchanged after the lapse of a fixed period of time, i.e., until a complete halt of the object member 12 at the position of the mechanical stopper 14 is accomplished (steps S8-4 to S8-6).

Then, the direct drive linear motor 33 mechanically presses the object member 12 against the stopper 14 while generating a constant thrust and maintains such action until the positional change (DIF) of the object member 12 becomes less than a predetermined value even after the lapse of a fixed period of time (steps S8-7 and S8-8).

A position sensor (unshown) may be employed to confirm that the object member 12 has come to a complete stop or that the reduction of its positional change is below the predetermined value. After this condition has been satisfied, at steps S8-9 and S8-10, the CPU 24 clears the position counter 28, and then releases the constant thrust from the linear motor 33 to thereby terminate the sequence.

According to the method described above in connection with FIG. 8, it is possible to achieve more precise detection of the point of origin than when using the sequence of FIG. 7. Even if the mechanical stopper 14 is of a type which is not perfectly rigid, such as a cushion member, detection of the point of origin can be performed with enhanced reliability and reproducibility by adopting the sequence of FIG. 8. Also with regard to the protection from inaccuracies resulting from disturbances, a great improvement is attainable because even if the object member 12 is moved by a disturbance larger than the thrust generated by the linear motor 33 during detection of its position while pressed against the mechanical stopper 14, any resulting displacement will be detected by the position sensor (unshown). Under those circumstances, detection of the point of origin using the mechanical stopper 14 can again be performed to thereby enhance reliability of the point of origin determination, even against large disturbances.

Figure 9:
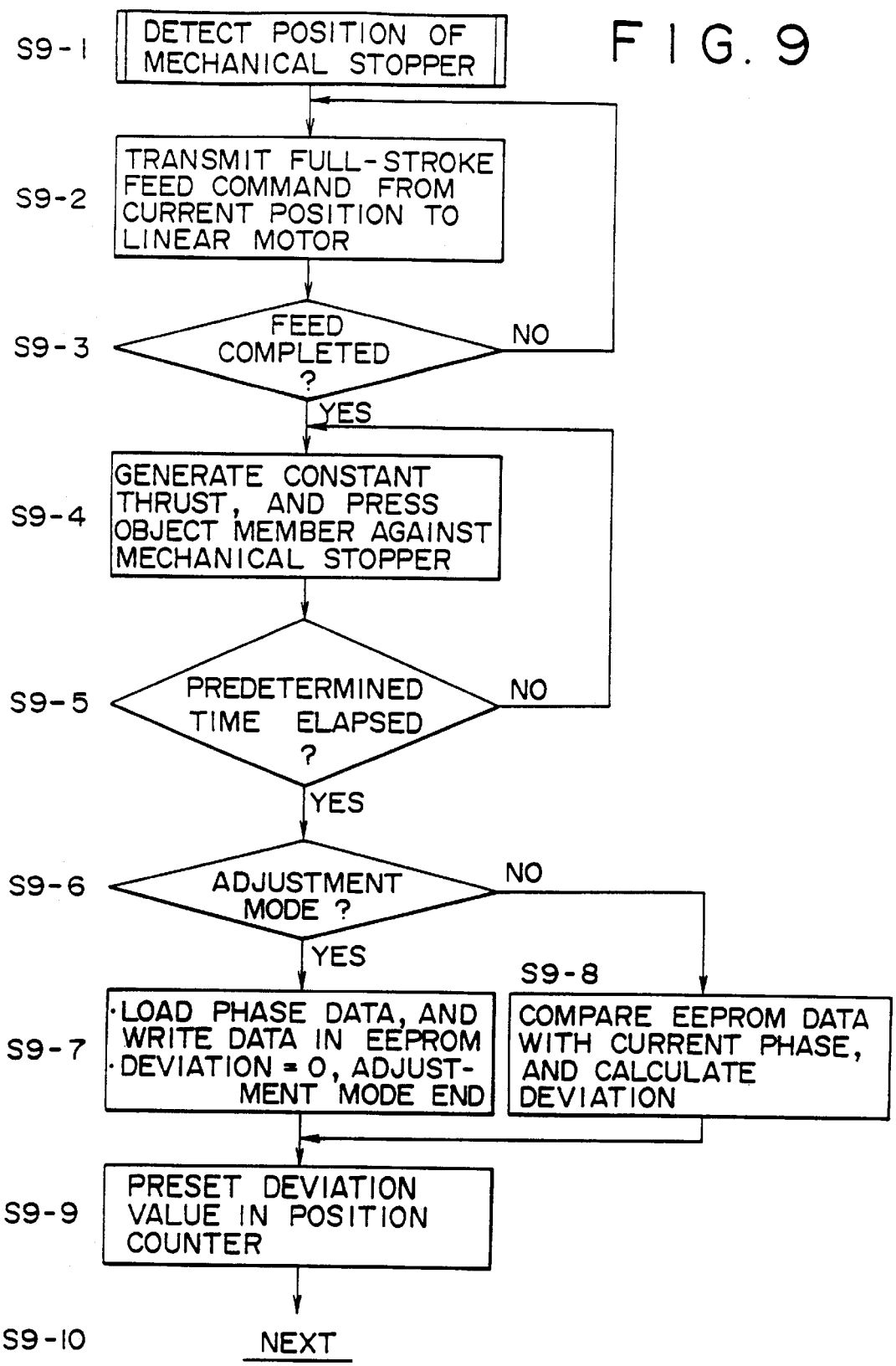
FIG. 9 is a flow chart depicting an exemplary sequence of steps for detecting the position of an end point with control of the phases after confirming a halt of the object member at a mechanical stopper.

A further example will now be described with reference to FIGS. 1 and 9. FIG. 9 is a flow chart of an exemplary sequence for controlling phases of periodic waveforms when detecting the end point of object member travel by means of applying a constant force or thrust to the object member. As alluded to above in connection with the description of FIGS. 15 and 16, in adjusting the point of origin position detection during this sequence, the phase of a periodic waveform representing the position of the object member 12 with respect to the mechanical stopper 14, as stored in the EEPROM 30 of FIG. 1, is compared with the phase of a periodic waveform representing the position of the object member 12 with respect to the mechanical stopper 14 after an adjustment. A correction is executed on the basis of the result of such comparison to thereby greatly enhance the precision of the point of origin determination.

Steps S9-1 through S9-5 of the sequence shown in FIG. 9 correspond to the aforementioned steps S7-1 through S7-5 discussed above in connection with FIG. 7. Briefly, the process is executed in the following manner.

In this portion of the sequence, the drive circuit 32 of FIG. 1 causes the direct drive linear motor 33 to drive the object member 12 in the minus (−) direction until it butts against the mechanical stopper 14 and thereafter causes the linear motor 33 to generate a constant thrust to press the object member 12 against the stopper 14; the halt position of the object member is then determined as the reference position for detecting the point of origin.

As before, prior to setting the position of the object member 12 to an absolute value, the position of the object member 12, which corresponds to the position of the movable unit 12a, is indefinite. At steps S9-1 and S9-2 of the sequence in FIG. 9, in order to firmly press the object member 12 against the mechanical stopper, the CPU 24 of FIG. 1 transmits a command to the drive circuit 32 to displace the object member 12 toward the mechanical stopper 14 by a distance equivalent to the full stroke in the minus (−) direction as indicated by the arrow A in FIG. 1. Consequently, the object member 12, whose position is to be measured, is mechanically butted against the stopper 14 and thereby brought to a halt at the position of the stopper 14.

Upon completion of the above feed (step S9-3), and in order to press the object member 12 against the mechanical stopper 14 (step S9-4), the drive circuit 32 causes the direct drive step, linear motor 33 to generate a constant thrust in the minus (−) direction. As a result, the object member 12 is mechanically pressed against the stopper 14 by the thrust of the direct drive linear motor 33. At step S9-5, the constant thrust is applied for a fixed period of time.

Thereafter during a point of origin detection adjustment mode, as shown at steps S9-6 and S9-7, the CPU 24 loads the phase data from the phase discriminator 22 of FIG. 1 and writes the phase data in the EEPROM 30 of FIG. 1. As this is the initial adjustment, the deviation is regarded as 0, and the adjustment mode is terminated.

When setting the absolute value of the point of origin position during any operation other than the initial adjustment mode, i.e., at the time of starting up or resetting of the system as shown at step S9-8, the CPU 24 compares the data then being loaded from the phase discriminator 22 with the data previously written in the EEPROM 30 during the adjustment mode. In performing the comparison, the CPU 24 calculates any deviation based on the assumption that the position of the object member 12 after the adjustment is at least within a displacement $\pm\lambda/2$ of the phase determined during the initial adjustment mode.

For example, in the system of FIG. 1, where the signals are divided into eight phases, 1 through 8, as shown in FIG. 5, and assuming that phase 1 data was obtained during the initial adjustment mode at the start-up of the system with the object member 12 pressed against the mechanical stopper 14, if phase 1 data is later obtained, i.e., when detecting the point of origin in a subsequent operation, then the deviation is 0. In other words, the same point of origin has been detected.

However, if when detecting the point of origin during a subsequent operation, phase 2 data is obtained, it signifies a deviation of 1. Similarly, if phase 3 data is obtained, it signifies a deviation of 2. If phase 4 data is obtained, the deviation is 3. Similarly, the deviation is minus 1 if phase 8 data is obtained, the deviation is minus 2 if phase 7 data is obtained, and the deviation is minus 3 if phase 6 data is obtained.

After calculation of the deviation, at step S9-9 of the sequence in FIG. 9, the CPU 24 presets the calculated deviation in the position counter 28 of FIG. 1. Upon completion of the sequence S9-9, the value of the position counter 28 indicates the absolute position corresponding to the point of origin. In the example of FIG. 5 where the four signals $A\sin\theta$, $A\cos\theta$, $-A\sin\theta$ and $-A\cos\theta$ of repetitive periodic waveforms are only divided into eight phases, subsequent to the adjustment mode it may not be possible to correctly detect any phase deviation (corresponding to a change in the point of origin) greater than $\pm 3\lambda/8$. However, by increasing the number of divisions, it is possible, to realize an improved system which is capable of correcting, subsequent to the adjustment mode, a maximum phase deviation of $\pm\lambda/2$.

The sequence of FIG. 9 is an exemplary case of controlling the phases for detection of the end point with pressed contact between the object member and the stopper 14 by the application of a constant force or thrust. This sequence may be combined with the end-point detection sequence of FIG. 8 which includes the step of confirming the halting of the object member 12 at the mechanical stopper 14. By combining the two sequences a further great improvement in detection capability may be realized.

As allowed above, for the purpose of limiting the displacement range of the object member 12 to be measured the direct drive linear motor 33 shown in FIG. 1 may be equipped with a mechanical stopper 14 at each end of its displacement range. In systems employing a motor 33 of the type mentioned, high position resolution is often required. Therefore, detection of the point of origin, i.e., setting of the initial position to an absolute value, is preferably performed by the system using the aforementioned repetitive periodic waveforms and the sequence of steps as shown in the flow charts of FIG. 7, 8 or 9. Consequently it becomes possible to produce a system at a reduced cost and of a smaller size while ensuring highly accurate and repeatable position detection.

Figure 10:
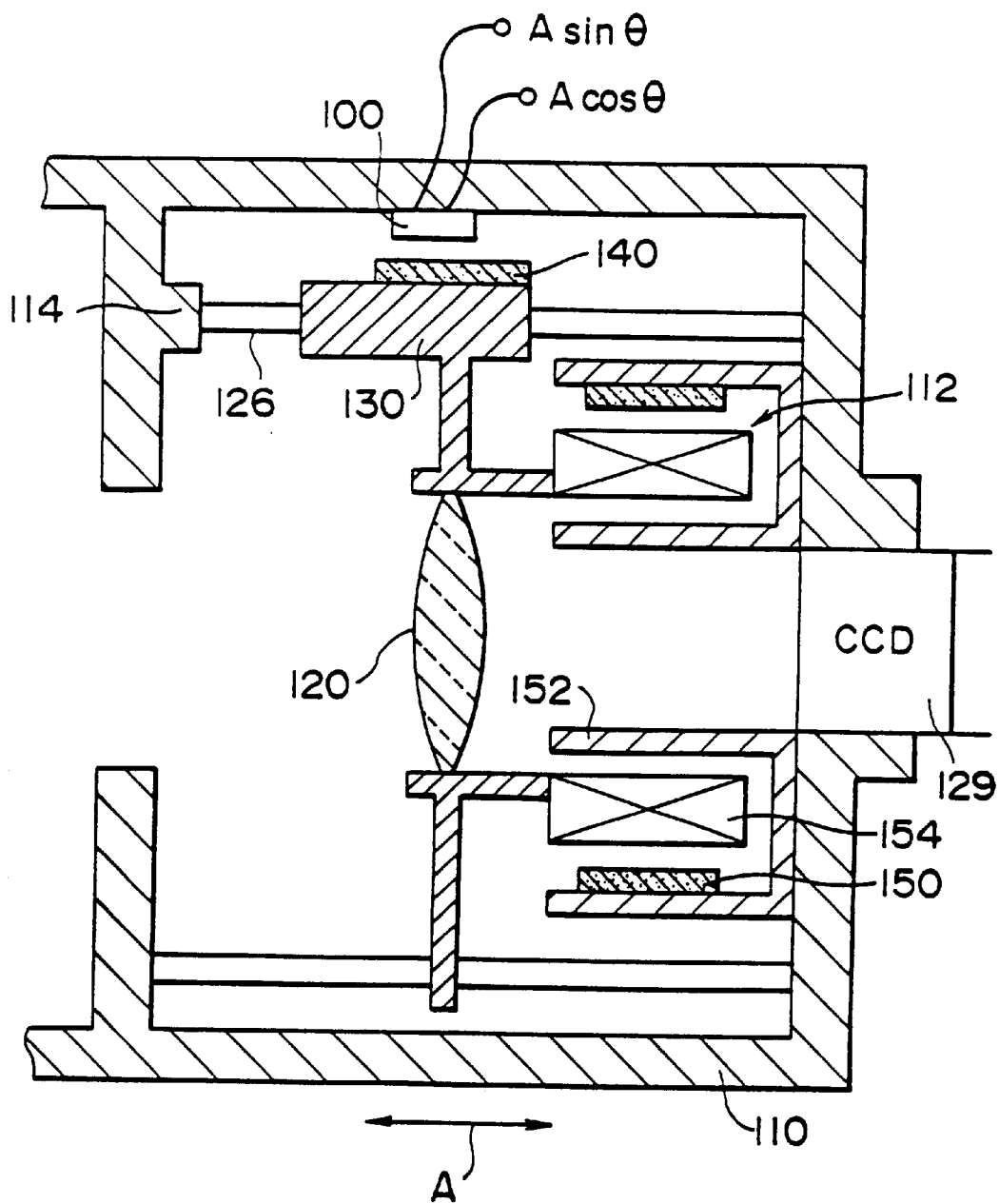
FIG. 10 is a sectional view of an optical system of a video camera for practicing the method of the present invention.

FIG. 10 is a sectional view of a position detecting apparatus for an optical system of a video camera to which the point of origin detecting method of the present invention may be applied.

In this embodiment, a magnetic MR sensor 100 including magnetoresistance element, is employed as a position detecting means. This optical lens system comprises a linear motor 112, a lens 120, a mechanical stopper 114, a reference axis 126, a bearing 130, an MR sensor 100 and a CCD 129 which are incorporated in a casing 110.

The MR sensor 100 is disposed opposite the magnet 140 and is fixedly anchored to the inner surface of the casing 110, while the magnet 140 is fixedly anchored to the bearing 130. The MR sensor 100 produces periodic waveform output signals, $A\sin\theta$ and $A\cos\theta$, per magnetization pitch $\lambda$ of the magnet 140.

In this embodiment, the linear motor 112 may be a voice-coil type direct drive motor, which includes a magnet 150, a yoke 152 and a coil 154. When the linear motor 112 is actuated, the bearing 130, and the magnet 140 anchored thereon, are displaced with the lens 120 in the directions indicated by the arrow A.

Figures 11, 14:
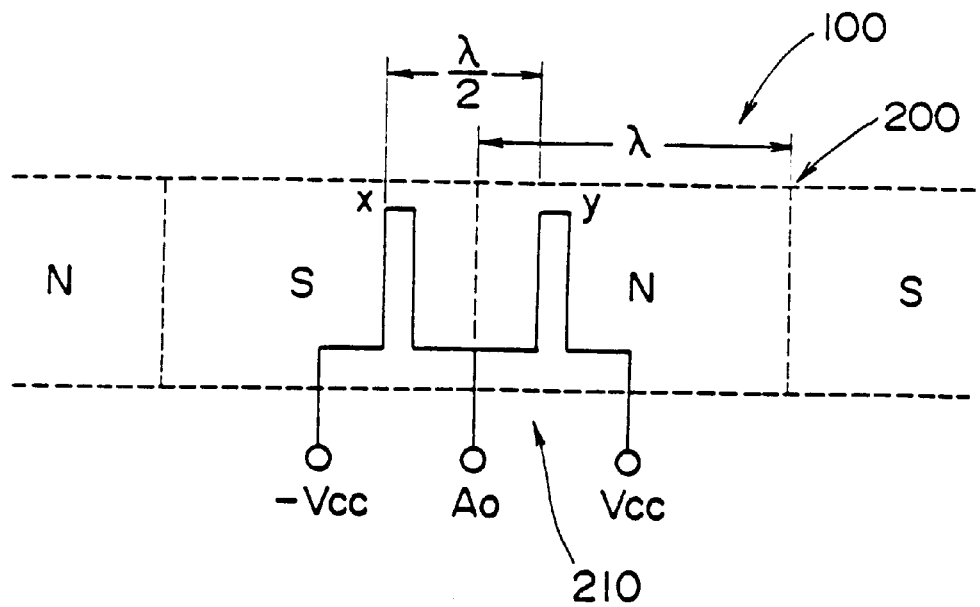
FIG. 11 shows a magnetoresistance element pattern of an MR sensor and a linearly magnetized magnet employed in the video camera of FIG. 10.
FIG. 14 is a table showing digital signals φ a and φ b obtained from a comparator employed in the system of FIG. 12, and phases P0 to P3 of such signals.

In FIG. 10, the magnetic MR sensor 100 serves as a position detector. As shown in FIG. 11, the MR sensor 100 comprises a magnet 200 and an MR pattern pickup 210 disposed opposite the magnet 200. The magnet 200 is linearly magnetized at an interval $\lambda$ which may be on the order of several 100 $\mu$m or so. The MR pattern pickup 210 consists of magneto-resistance element patterns x, y which are arrayed at an interval of $\lambda/2$.

The magnetoresistance element patterns x, y are connected in series to DC power sources $\pm$Vcc and generate sinusoidal repetitive periodic waveforms at the GND center Ao in accordance with the motion of the magnet 200 caused by the displacement of the bearing 130 which corresponds to the object member 12 in FIG. 1. In an arrangement where two of such magnetoresistance patterns 210 are disposed with a positional deviation of $\lambda/4$, the signals $A\sin\theta$ and $A\cos\theta$ having a period $\lambda$ and an amplitude A are generated. In this manner, the MR sensor 100 is capable of producing the same output as that of the aforementioned optical linear scale 10 shown in FIGS. 1 and 2.

When using a voice-coil type linear motor in the position detecting apparatus of FIG. 10, the same point of origin detection algorithms used in connection with the apparatus of FIG. 1 are also usable. Accordingly it is possible to realize a low-cost, small-size system, which is reliably repeatable and which has high positional precision.

In an optical system for a video camera, as described, precision on the order of microns may be required. Such requirement can be satisfied by including in the video camera the structure of FIG. 10, wherein enhanced capabilities, including improvements in absolute positioning accuracy, and reliable, repeatable position determinations may be achieved, thereby enhancing the focusing function of the optical system.

In the embodiments shown in FIGS. 1 and 9, detection of the point of origin for setting the position to an absolute value is performed at the time of starting up the system operation or resetting the system or, if necessary, during operation. As will be appreciated by the artisan, the recording medium is not limited to the use of aforementioned EEPROM.

Figure 12:
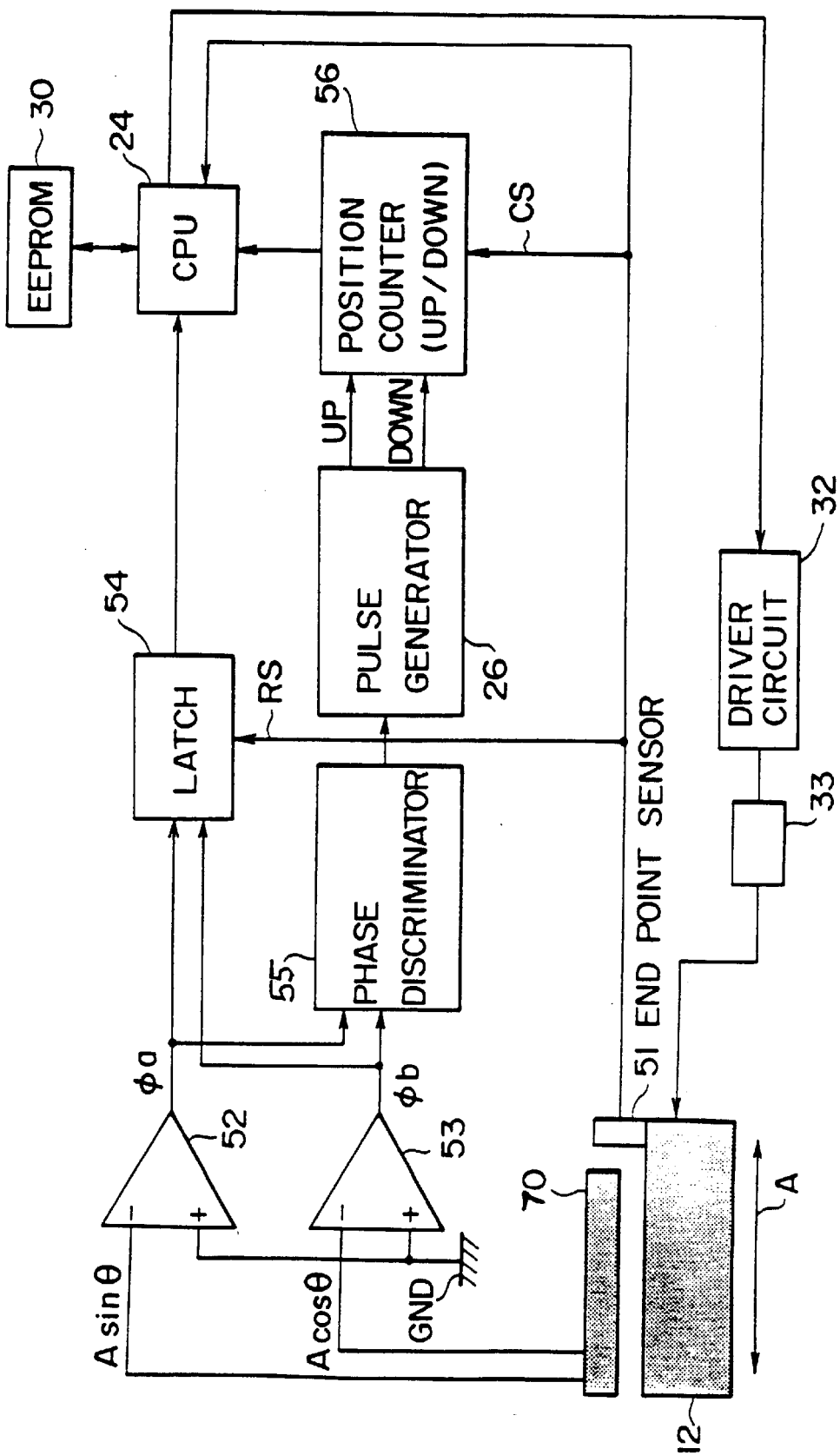
FIG. 12 is a block diagram of another preferred position detecting system for practicing the method of the present invention for detecting the origin point of a position sensor.

FIG. 12 is a block diagram of a further preferred position detecting system adapted to carry out the point of origin detecting method according to the present invention, wherein the component circuits and members corresponding in function to those in FIG. 1 are denoted by the use of same reference numerals.

A position detecting system according to FIG. 12 may comprise an optical linear scale 70, an object member 12 to be measured, an end point sensor 51, two comparators 52 and 53, a phase discriminator 55, a CPU 24, a pulse generator 26, a position counter 56, an EEPROM 30, a drive circuit 32, and a direct drive motor 33. In this example, the object member 12 may, for example be a table of a machine tool for holding a workpiece thereon or the like.

FIG. 13 is a representation of the optical linear scale 70 of FIG. 12. The optical linear scale 70 of FIG. 13 differs from the optical linear scale 10 of FIG. 2, in that it includes an end point sensor 51 and a light shield plate 13 on one side. The other structures are the similar as those of the optical linear scale 10 shown in FIG. 2.

The end point sensor 51 determines the timing for measuring the point of origin in the system of FIG. 12. The end point sensor 51 includes a photo interrupter system comprising a light emitting element 60, a slit member 62 and a light receiving element 64. The light output from the light emitting element 60 is transmitted via a slit 63 in the slit member 62 to the light receiving element 64. The light emitting element 60 may be an LED or the like, and the light receiving element 64 may be a photoelectric conversion element (solar battery) or the like.

The shield plate 13 is fixedly anchored to a measuring plate 12a. When the plate 12a is displaced rightward, toward the end position depicted in FIG. 12, the shield plate 13 moves between the light emitting element 60 and the slit 63 to thereby intercept the light output from the light emitting element 60, so that the light receiving element 64 produces a edge signal, EDGE. The end point sensor 51 detects the end point position in response to generation of such an edge signal or a change of state of the signal, EDGE.

The light receiving elements 44, 46 shown in FIG. 13 are connected respectively to minus terminals of the comparators 52, 53, respectively, as shown in FIG. 12. The plus terminals of the comparators 52, 53 are connected to ground, and the output terminals thereof are connected to a latch circuit 54 and to a phase discriminator 55. The latch circuit 54 is connected to the end point sensor 51. The edge signal, EDGE, from the end point sensor 51 serves as a latch signal to time the action of the latch circuit 54.

Figure 16:
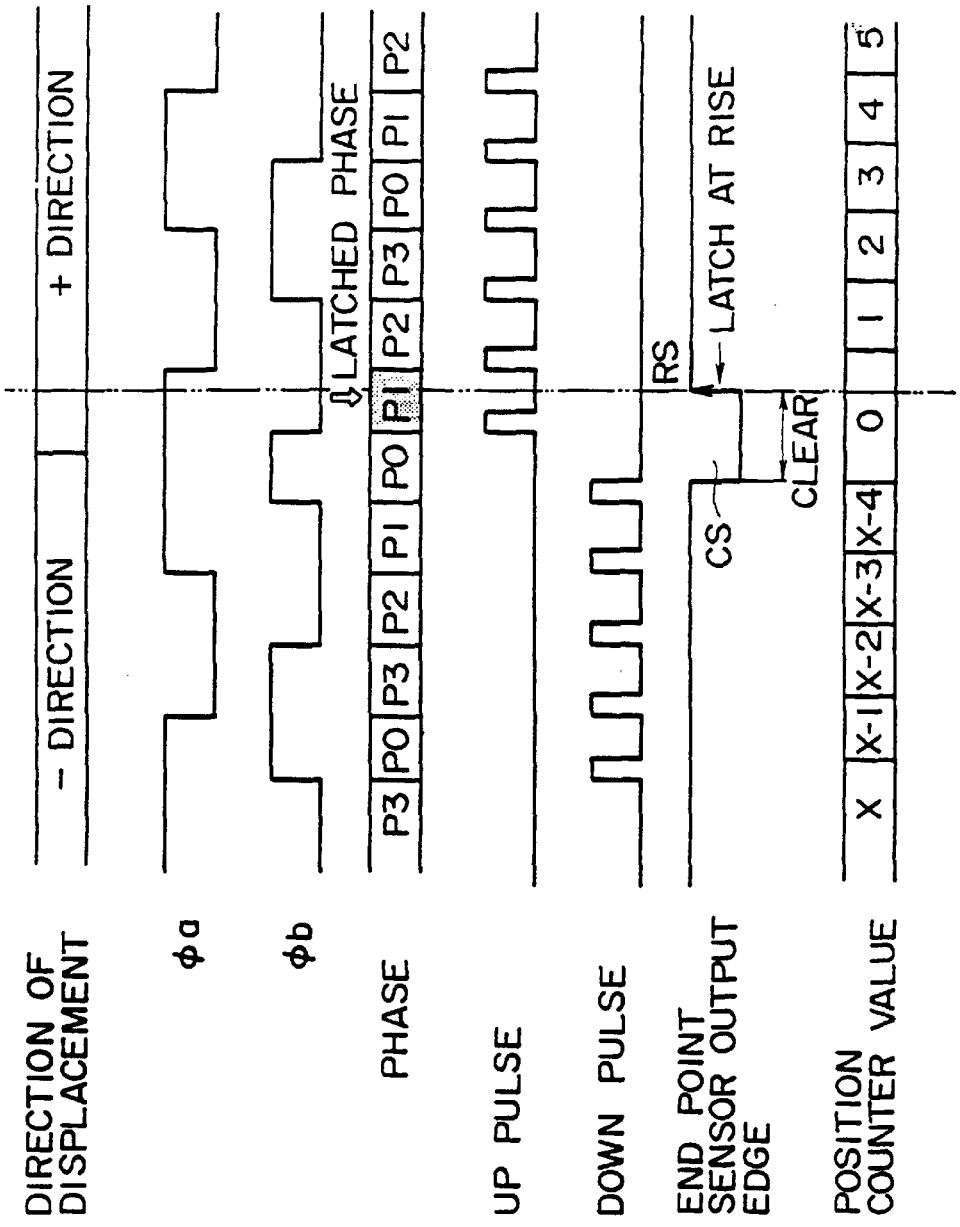
FIG. 16 is a timing chart depicting exemplary states of signals in a sequence of steps for detecting an end point.

The phase discriminator 55 is connected via a pulse generator 26 to a position counter 56, to which the end point sensor 51 is also connected. When the edge signal EDGE, output from the end point sensor 51, goes to its low level, as shown in FIG. 16, a clear signal, CS, is supplied to the position counter 56. The latch circuit 54 and the position counter 56 are connected to the CPU 24, to which an EEPROM 30, which serves as an external memory or storage medium, is also connected. The CPU 24 is connected to a drive circuit 32, and a direct drive motor 33 is actuated via the drive circuit 32 in response to a command signal from the CPU 24 to thereby displace the object member 12 in the directions indicated by the arrow A. In this manner the CPU 24 controls the direction of the driving of the object member 12 and the position thereof.

In accordance with the displacement of the slit plate 12a, the light receiving elements 44, 46 generate output signals in the form of repetitive periodic waveforms Asin θ and Acos θ of period λ (μm) as shown in FIG. 3. The absolute position of the object member 12 may be detected by the use of the signals Asin θ and Acos θ in accordance with the following procedure.

As shown in FIG. 12, the signals Asin θ and Acos θ are compared with a ground level by the comparators 52 and 53, respectively, whereby two digital signals φ a and φ b are produced. Specifically, the digital signal φ a is the result of comparing the signal Asin θ with the ground level, and the digital signal φ b is the result of comparing the signal Asin θ with the ground level.

Figure 15:
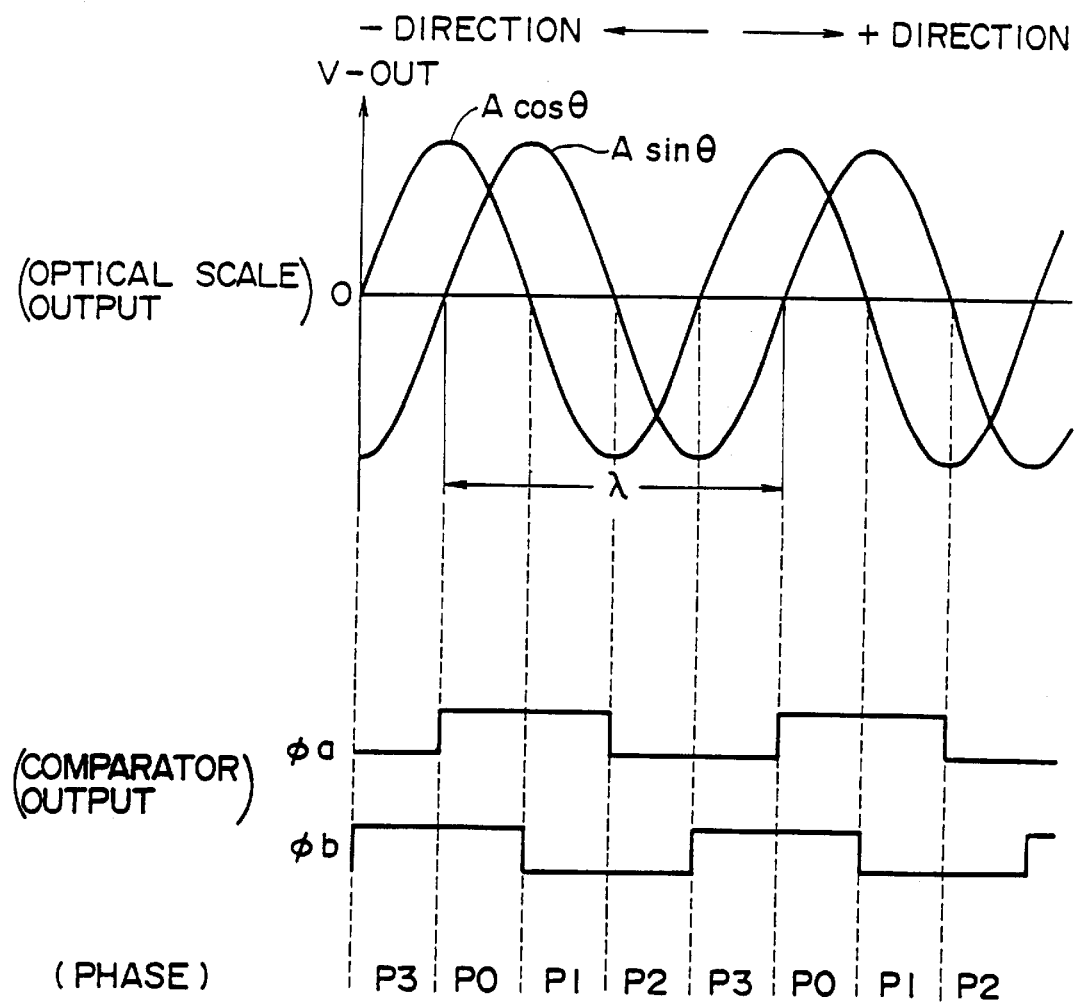
FIG. 15 is a graph depicting four phases obtained by dividing the output periodic waveforms of FIG. 3.

In the illustrated embodiment, the digital signals φ a and φ b, considered together, are divided into four phases, P0 to P3, as shown in FIGS. 14 and 15. The phase discriminator 55 in FIG. 12 provides an output consisting of the appropriate one of the four phases P0 to P3.

The pulse generator 26 in FIG. 12 generates up-pulses or down-pulses, as depicted in FIG. 16, in accordance with changes in the phases P0 through P3 as input from the phase discriminator 55 and also with the plus or minus direction of the displacement of the object member. The up-or down-pulses are supplied to the position counter 56.

The position counter 56, in the example shown in FIG. 12, is an up/down counter which increases or decreases its count value by one in response to an up-pulse or a down-pulse respectively. The count value is input to the CPU 24, which then determines the position of the object member in accordance with the count. As described above, the count value in the position counter 56 can be cleared in response to a clear signal CS, so that when the output of the end point sensor 51 goes to its low level (see FIG. 16), the data, or count value, is cleared to zero.

The digital signals φ a and φ b are input to the latch circuit 54 and latched therein in response to the latch signal RS obtained from the end point sensor 51, i.e., in synchronism with the rising edge of the signal EDGE from the end point sensor 51.

A preferred position detecting method will now be described by using the above described system. The following description will be made with reference to FIGS. 12, 13, 15, 16 and 17.

Figure 17:
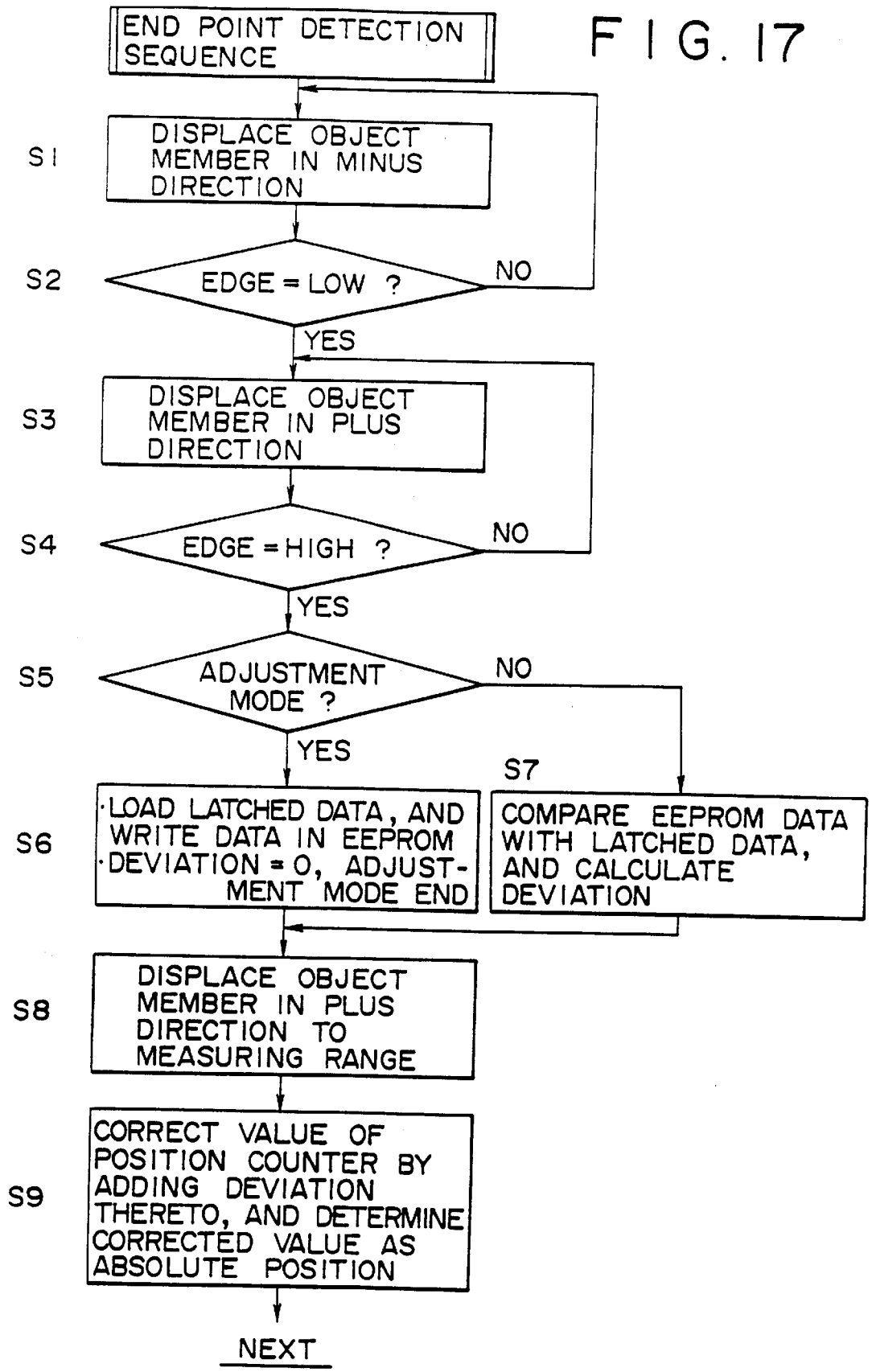
FIG. 17 is a flow chart depicting a preferred sequence of steps for detecting an end point.

As detailed above, FIG. 12 is a block diagram of a position detecting system according to an embodiment of the present invention, and FIG. 16 is a timing chart depicting exemplary states of various signals from the system of FIG. 12 and how those signals change during an end point detection sequence. FIG. 17 is a flow chart of an exemplary sequence of steps for detecting the position of an end point.

In the following discussion, it is assumed that the position of the end point sensor 51 of FIG. 12 is outside the normal displacement range of the object member 12 in its minus (−) direction.

At steps S1 and S2 of the sequence in FIG. 17, the direct drive linear motor 33 displaces the object member 12 in the minus direction until the edge signal EDGE output from the end point sensor 51 goes to its low level. In this state, the shield plate 13 shown in FIG. 13 intercepts the light output from the light emitting element 60 of the end point sensor 51.

Subsequently, at steps S3 and S4 of the sequence in FIG. 17, the direct drive linear motor 33 displaces the object member 12 in the plus (+) direction until the output of the end point sensor 51 goes to a high level, whereby the light from the light emitting source 60 of the end point sensor 51 becomes unshielded by the shield plate 13 in FIG. 13.

During steps S1 to S4, the edge signal EDGE output from the end point sensor 51 first goes to its low level as shown in FIG. 16 whereupon the count value of the position counter 56 in FIG. 12 is cleared. Subsequently the data (levels) of the digital signals φ a, φ b are latched by the latch circuit 54 in response to the latch signal RS (FIGS. 12 and 16) which occurs synchronously with the rising edge of the signal EDGE from the end point sensor 51. The change in level of the output of the end point sensor 51 is thereby determined to be the point of origin reference position.

In the exemplary chart of FIG. 16, where the data (levels) of the digital signals φ a, φ b are latched by the latch circuit 54, the level of the digital signal φ a is high while that of the digital signal φ b is low. Therefore, as explained above with reference to FIG. 15, the latched phase is P1.

Next, at step S5 of the sequence shown in FIG. 17, a decision is made as to whether the apparatus, in the current operation, is operating in an initial adjustment mode to determine the point of origin or an actual point of origin detection mode which would typically occur subsequent thereto. If the result of the decision step 5S signifies an initial point of origin adjustment mode operation is in progress, the process proceeds to step S6 of the sequence. If the result signifies a subsequent point of origin detection mode operation is in progress, the process proceeds to step S7.

If the progress proceeds to step S6, the data of the digital signals φ a, φ b, latched by the latch circuit 54 in FIG. 12 is loaded, and then the values of the data are written in the EEPROM 30 of FIG. 12 (which is an external storage medium), whereby the point of origin adjustment mode is completed. As this case represents the initial determination of the point of origin, the positional deviation is zero.

As alluded to above, the process proceeds to step S7 if any mode other than the initial point of origin adjustment mode is in progress. In step S7, the CPU 24 of FIG. 12 compares the adjustment data written or stored in the EEPROM 30 with the data being currently input to the latch 54, and calculates the positional deviation, if any, of the end point.

If the end point deviation subsequent to the adjustment mode is smaller than ±λ/2 (λ being the periodic wave length shown in FIGS. 13 and 15), the CPU 24 compares the adjustment-mode data written in the EEPROM 30 with the data being input to the latch circuit 54, and calculates the positional deviation between the end point data determined during the initial adjustment mode at step S6 and the current end point data.

When the adjustment-mode data written in the EEPROM 30 is coincident with the data currently being input to the latch circuit 54, the positional deviation is zero. However, when the adjustment-mode data written in the EEPROM 30 has a deviation of 1 phase from the data being input to the latch circuit 54, the deviation may represent either a +1 phase or a −1 phase depending on the direction of displacement. In other words, the values +1 phase or −1 phase represent positional deviations.

Since, in the example of FIG. 16, the phase P1 is latched in the latch circuit 54, during the initial adjustment mode at step S6 of the sequence in FIG. 17, data corresponding to the phase P1 is stored in the EEPROM 30. At step S7, which represents operation in a mode other than the initial adjustment mode, any deviation from the data in the EEPROM 30 during step S6 is calculated and the data input to the latch circuit 54. For example, if the data determined at step S7 corresponds to the phase P0, the deviation is a −1 phase with respect to the data written in the EEPROM 30 at step S6. The subsequent position data may then be corrected by adding −1 to the count value of the position counter 56 of FIG. 12.

If the value determined at step 7 corresponds to phase P1, the deviation is 0. If the value determined at step S7 corresponds to phase P2, the deviation is +1. To correct for such a deviation at the value +1 is added to the count value of the position counter 56. At the time the power supply is switched on, the value X of the count value in the position counter 56 of FIG. 12 is an indefinite value. Therefore, as shown at step S8 of the sequence in FIG. 17, the object member 12 is displaced to a desired position for use or to a predetermined position in the plus direction as indicated by the arrow A in FIG. 12. Then, as shown at step S9 of the sequence, the position of the object member 12 is represented by a value obtained by adding the deviation determined in Step 7 to the value of in the position counter 56. By execution of the sequence of FIG. 17, the positional variation of the end point can, at the time of positioning the object member 12 after the initial adjustment mode, be corrected if within a minimum deviation range of ±λ/2. Also, in principle, by executing this sequence the quantization error derived from the comparison or digitization step, may be eliminated.

However, since in this embodiment, the period λ of the periodic waveform is only divided into four segments, the maximum detectable deviation is in the range of two phases or ±λ/4. In other words, while correction within a deviation range of ±λ/2 is theoretically achievable, in practice, where the period waveform is only divided into four phases, the maximum correctable variation is ±λ/4. However, in practice, when designing a position detecting system using a direct drive motor or a linear motor, the period λ of the periodic waveform is divided into a number far greater than four. Therefore, the maximum correctable variation subsequent to the adjustment mode may be ±λ/2.

As alluded to above in connection with the discussion of FIGS. 9 and 4–6, in the case of where one period is divided into eight phases, the deviation subsequent to step S7 (adjustment mode) of the sequence in FIG. 17 is correctable up to a maximum deviation of ±λ/8.

In other words, the correction range can be widened by increasing the number of divisions of the period of the periodic waveforms generated, and it is theoretically possible to realize a system capable of detecting positional deviations up to a maximum variation of ±λ/2.

Figure 18:
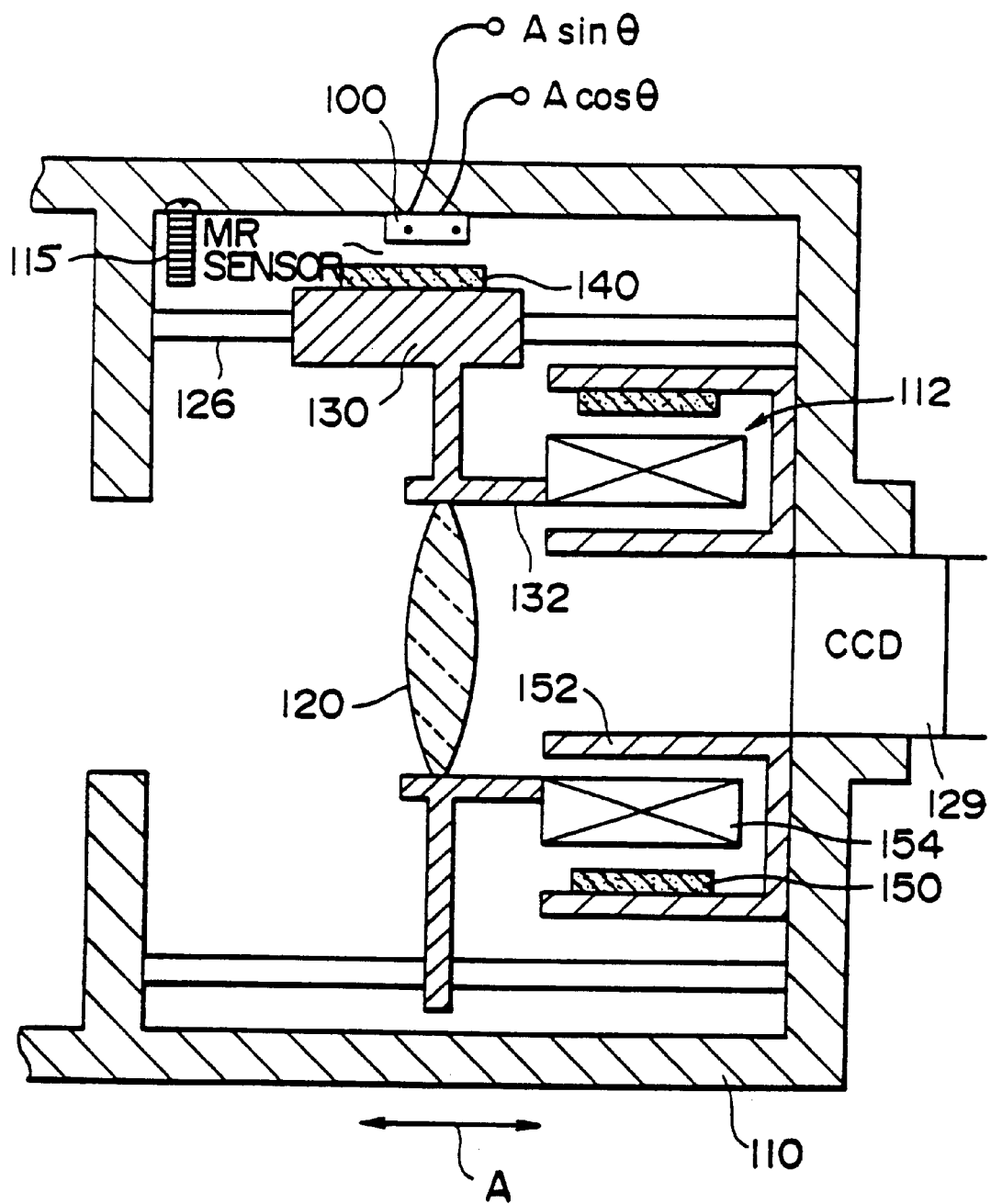
FIG. 18 is a sectional view of another example of an optical system of a video camera for practicing the method of the present invention.

FIG. 18 is a sectional view of an optical lens system for a video camera to which the point of origin detecting method of the present invention may be applied.

In this embodiment, an end point sensor 115 is provided in place of the mechanical stopper 114 employed in the embodiment of FIG. 10. The other structures are the same as those of the embodiment shown in FIG. 10.

Generally, high resolution, high accuracy, and reliable position detection is required in any position detecting apparatus which uses a direct drive motor, as well as in video cameras or the like. Such requirements can be satisfied by applying the embodiment of FIGS. 12, 17 and 18 to a precision apparatus, wherein the point of origin position detection is enhanced and the performance of the system thereby improved.

Also in the embodiments of FIGS. 12, 17 and 18, detection of the point of origin for setting the position of an object member to the proper absolute value is performed at the time start up or resetting the system or, if necessary, again daring such operation.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the recording storage medium is not limited to the use of an EEPROM. The embodiment was chosen and described in order to best explain the principles of the invention and its practical application to thereby enable others skilled in the art to best utilize-the invention in various embodiments and with various modifications as are suited to the particular use contemplated. It is intended that the scope of the invention be defined by the claims appended hereto.

What is claimed is:

1. A device for calibrating a position sensor with respect to a point of origin in a system for determining a position of an object member which is displaceable within a displacement range, said system including a stop means in proximity to an end of said displacement range, wherein said position sensor generates an output indicative of the position of said object member, said device comprising:

means for displacing said object member into an abutting relationship with said stop means;

means for detecting a position of said object member when abutting said stop means; and means for setting the point of origin of said position sensor at the detected position of said object member when abutting said stop means;

wherein said means for displacing said object member continues to drive said object member into said stop means while said means for setting the point of origin sets said point of origin.

2. The device of claim 1, wherein said means for displaying said object member comprise a linear drive motor.

3. The device of claim 1, wherein said means for detecting a position of said object member comprise:

an optical linear scale which moves with said object member;

a light emitting element for shining light through said optical linear scale;

two light detecting elements for detecting light from said light emitting element through said optical linear scale; and a slit plate between said two light detecting elements and said light emitting element.

4. The system of claim 3, wherein said means for detecting a position of said object member further comprise a pulse counter operated by output from said light detecting elements.

5. The system of claim 4 wherein said output of said light detecting elements is processed by a phase discriminator which provides either an up pulse or down pulse to said pulse counter.

6. The device of claim 1, wherein said means for setting the point of origin comprise means for resetting a pulse counter.

7. The device of claim 1, wherein said object member is a table for supporting a workpiece in a machine tool.

8. A device for calibrating a position sensor with respect to a point of origin in a system for determining a position of an object member which is displaceable within a displacement range, said system including a stop means in proximity to an end of said displacement range, wherein said position sensor generates an output indicative of the position of said object member, said device comprising:

means for displacing said object member into an abutting relationship with said stop means;

means for detecting a position of said object member when abutting said stop means; and means for setting the point of origin of said position sensor at the detected position of said object member when abutting said stop means, wherein said position sensor detects the position of said object member by means of a plurality of repetitive periodic waveforms, and wherein said repetitive periodic waveforms are composed of sine waves and cosine waves.

9. A device for detecting a point of origin of a position sensor in a system for determining a position of an object member which is displaceable within a displacement range with a stop-means in proximity to an end of said displacement range, said position sensor being operable to detect the position of said object member by means of repetitive periodic waveforms resolvable into multiple phases, said device comprising:

means for displacing said object member in a first direction into an abutting relationship with said stop means;

means for setting the point of origin of said position sensor when said object member abuts said stop means;

means for determining a first phase relationship of the repetitive periodic waveforms by comparing magnitudes of said periodic waveforms to each other;

means for storing said first phase relationship of the repetitive periodic waveforms, as reference data in a storage medium, said first phase relationship corresponding to said object member being positioned at the point of origin abutting said stop means;

means for determining a second phase relationship of said repetitive periodic waveforms by comparing magnitudes of said periodic waveforms, said second phase relationship corresponding to a subsequent detection of the point of origin of said position sensor;

means for comparing the stored reference data with said second phase relationship of the repetitive periodic waveforms; and means for correcting the setting of the point of origin determined by said subsequent detection according to said comparison.

10. A system for detecting a point of origin of a position sensor in a system for determining a position of an object member which is displaceable within a displacement range, an end point sensor disposed in proximity to an end of said displacement range, said position sensor being operable to generate an output indicative of the position of said object member, said detecting system comprising the steps of:

means for displacing said object member in a first direction until it reaches the end of said displacement range;

means for detecting an arrival of the object member at the end of said displacement range by said end point sensor and thereupon generating a signal;

means for storing object member position data from said position sensor as point of origin reference data in a storage medium in response to said signal from said end point sensor;

means for comparing, in response to each subsequent signal from said end point sensor indicative of a subsequent arrival of said object member at the end of said displacement range, object member position data from said position sensor with the reference data; and means for correcting the point of origin of said position sensor according to said comparing step;

wherein said position sensor is a linear position sensor; and wherein during said detecting function, said linear position sensor detects the position of the object member by means of repetitive periodic waveforms output by said position sensor; and wherein the comparing means further provides the functions of:

comparing a first phase of the periodic waveforms obtained as point of origin reference data during said steps of detecting and storing with a second phase of the periodic waveforms output by said position sensor as point of origin data on the output of a subsequent signal from said end point sensor.

11. The detecting system according to claim 10, wherein said repetitive periodic waveforms are composed of sine waves and cosine waves.

12. A device for calibrating a position sensor with respect to a point of origin in a system for determining a position of an object member which is displaceable within a displacement range, said system including a stop member at an end of said displacement range, wherein said position sensor generates an output indicative of the position of said object member, said device comprising:

a linear motor for displacing said object member within said displacement range;

an optical linear scale which moves with said object member;

a light emitting element for shining light through said optical linear scale;

two light detecting elements for detecting light from said light emitting element through said optical linear scale;

a slit plate between said two light detecting elements and said light emitting element;

a phase discriminator which outputs either an up pulse or down pulse based on a phase relationship between signals output from said two light detecting elements; and a pulse counter operated by said output from said phase discriminator.

13. The device of claim 12, further comprising a reset pulse which is sent to reset said pulse counter when said object member is abutting said stop member.

* * * * *